United States Patent [19]

Bormioli

[11] Patent Number: 4,520,937

[45] Date of Patent: Jun. 4, 1985

[54] GLASS STORAGE JAR

[75] Inventor: Pier L. Bormioli, Mariano, Italy

[73] Assignee: Vetreria Padana Polesana, S.p.A., Bergantino, Italy

[21] Appl. No.: 553,760

[22] Filed: Nov. 21, 1983

[30] Foreign Application Priority Data

Feb. 8, 1983 [IT] Italy ............................. 28919/83[U]

[51] Int. Cl.³ .............................................. B65D 21/00
[52] U.S. Cl. ................................................... 215/10
[58] Field of Search ................. 215/10, 341, 346, 352

[56] References Cited

U.S. PATENT DOCUMENTS 978,634 12/1910 Overmyer ............................ 215/10

FOREIGN PATENT DOCUMENTS 531826 8/1931 Fed. Rep. of Germany ........ 215/10

Primary Examiner—George T. Hall
Attorney, Agent, or Firm—Laff, Whitesel, Conte & Saret

[57] ABSTRACT

The invention relates to an improved glass storage jar comprising a lid (1) which fits over and about the jar-neck (7), and incorporating a shaped annular seal (3) designed both to provide an efficient seal and to obviate direct contact between the lid and the neck of the jar; the jar itself being embodied in three distinct and harmoniously-proportioned sizes, all of which accept the one same size of lid. The jar is principally a household item, being used as a container for foodstuffs and the like.

4 Claims, 2 Drawing Figures

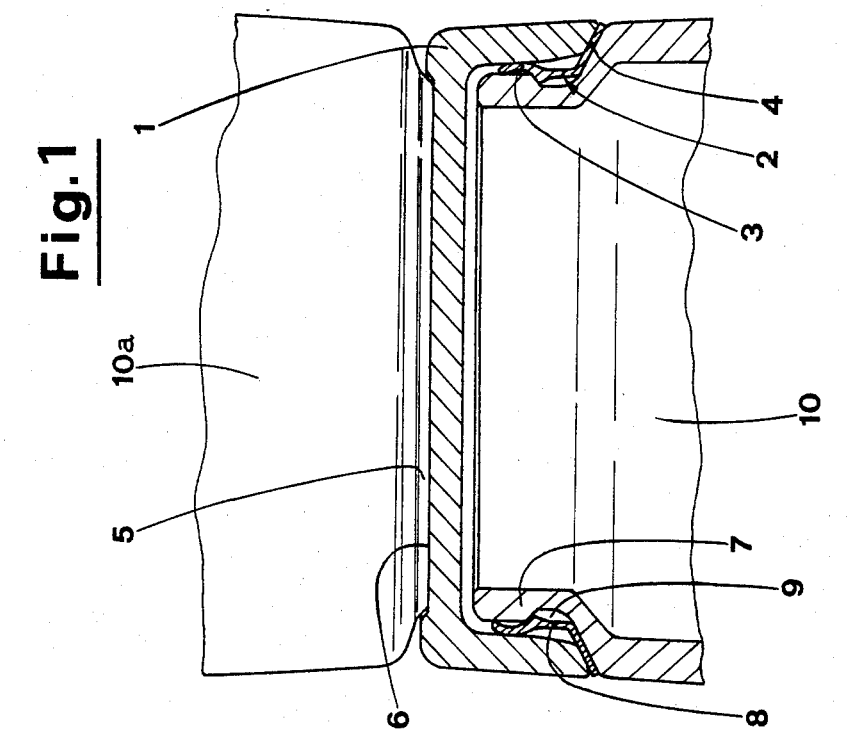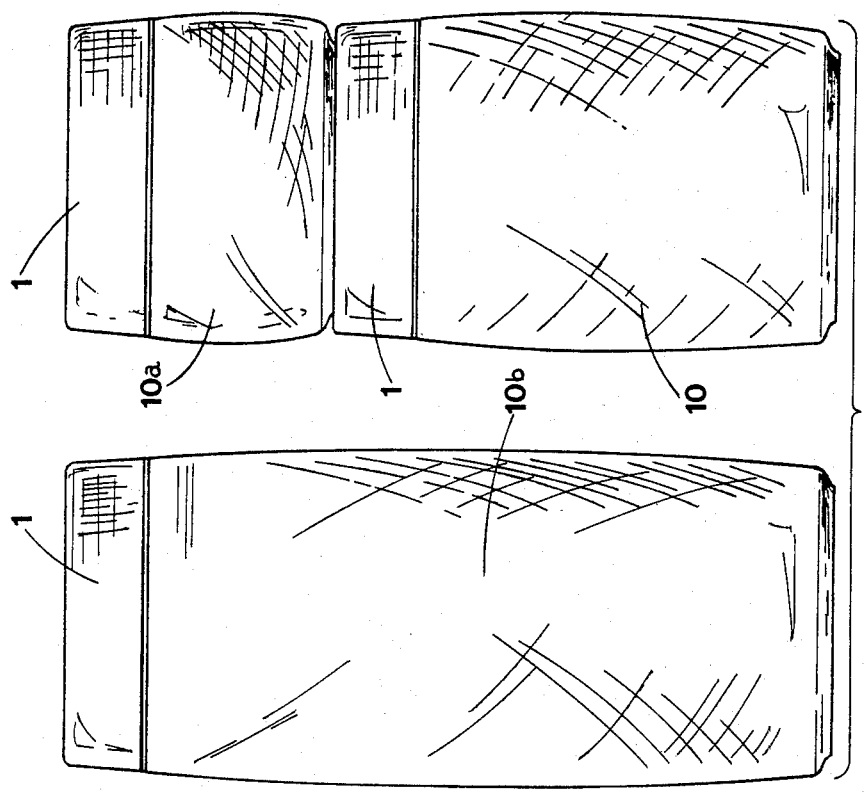

GLASS STORAGE JAR

BACKGROUND OF THE INVENTION

The invention described herein relates to an improved glass storage jar.

The jar to which the invention relates is of the type having a glass lid which fits over and about the neck of the jar itself, a type finding usefulness for the most part in domestic surroundings for keeping foodstuffs and the like—though by no means restricted to such use.

Advantages offered by the jar described herein are those of providing a simple, economical and aesthetically agreeable solution to the problem of creating an efficient pairing-of and seal-between jar and lid, and, at the same time, of avoiding the danger of the jar-and-lid's becoming chipped or cracked—a common enough risk with jars of the kind.

Another advantage of the jar described herein is that of its being at once inexpensive to produce, easy and economical to pack, handle and freight, and markedly easy and convenient to stow, from the consumer point-of-view.

SUMMARY OF THE INVENTION

These, and other advantages besides, are all provided by the storage jar described herein, being of the type having a lid which fits over and about the neck of the jar itself, and characterized in that it comprises an annular seal fashioned from flexible material and located about the neck of the jar; said seal in turn comprising a first stretch shaped and located such as to remain compressed between the inner surface of the lid and the outer surface of the jar-neck on positioning of the former about the latter, and a second stretch shaped and located such as to offer a seating to the rim of the lid when resting on the exterior of the jar itself.

BRIEF DESCRIPTION OF THE DRAWINGS

Further features and advantages of the invention will emerge from the following description of a preferred embodiment thereof, and from the accompanying drawings, in which:

FIG. 1 shows a vertical elevation of the jar to which the invention relates, with the lid thereof duly located about its neck, and a further jar resting on the top of said lid;

FIG. 2 shows a vertical elevation of three jars of varying height—of the type to which the invention relates—two of which are stacked one on top of the other.

DESCRIPTION OF THE PREFERRED EMBODIMENT

The jar described herein is fashioned from glass, and is of the type having a lid 1—likewise in glass—which fits over the neck 7 of the jar and is located around the outside thereof. The body 10-10a-10b of the jar is embodied in three distinct heights, as may be seen from FIG. 2, whilst the lid 1 remains common to all three sizes of jar. Thus, one is able to turn out varying heights of jar—hence different capacities—utilizing the one mold for their lids, and reduce production costs per size of jar as a result.

As one can clearly discern from FIG. 2, the height of the jar-bodies is such that when stacking the jar comprising body 10a and lid 1 on top of that comprising body 10 and further lid 1, their combined heights equal that of the jar comprising body 10b and lid 1.

This stacking of one jar on another is made easy by virtue of a protrusion 5 issuing from the base of each single jar, and being of size and shape such as will lodge nicely within a recess 6 located in the lid 1 of each said single jar.

It will be observed further, that the height of two jars of the type incorporating body 10a stacked one on top of the other, will match that of the jar having body 10.

The features thus described give a reduction in the overall dimensions of a set of three jars, which will be packaged together, generally speaking, as well as offering a saving in space, given the user's need for finding room to store away jars of differing size.

Further, the provision of a protrusion 5 and matching recess 6 makes stacking notably safe and secure—whether the jars placed one on top of the other happen to be of equal or different size.

Provision is made for an annular seal 2 fashioned from flexible material and located about the neck 7 of the jar; said seal comprising a first stretch 3 of which the cross-section exhibits an arcuate profile whose maximum width-dimension (from chord-to-vertex) measures marginally greater than the radial clearance existing between lid 1 and neck 7. Embodied thus, this stretch 3 of the seal 2 remains compressed between the inner surface of lid 1 and the outer surface of neck 7 when these two are paired together, producing an efficient seal between lid and jar, as well as a noticeably solid connection of the two.

Said seal 2 further comprises a second stretch 4 shaped and disposed such as to provide a seating for the lower rim of lid 1 when resting on the outer surface of the jar. As will be seen in FIG. 1, said second stretch 4 of seal 2 is flat, to all intents and purposes, and rests on the shoulder of the jar in such a way as to protrude neither from the jar itself nor beyond the lid-circumference when located thereon.

The same seal 2 also comprises a third stretch 8 between said first and second stretches, designed to locate in an undercut 9 offered by the outside of the jar-neck, and thus to ensure a tight fit of the seal about the latter and inhibit any movement thereof.

The second stretch 4 of said seal 2 also contributes to the creation of an efficient seal between kid and jar. Furthermore, the physical presence of the seal 2 rules out any possibility of contact between the lid and the neck of the jar, thereby precluding any chance of the lid or jar-body becoming chipped—as happens as a result of direct contact between elements such as these two, fashioned from glass.

What is more, the fact that the lid 1 is embodied in transparent glass permits the seal's 2 fulfilling an aesthetic role, as well as perhaps serving to identify the jar's contents.

Finally, it will be observed that the seal, and the mouth and neck of the single jar, remain identical for all three jars of the set.

What is claimed:

1. A glass storage jar comprising a body, a neck extending from the body and having a smaller circumference than the body portion from which it extends and defining a shoulder, a lid sized to fit over the neck and having an inner circumference larger than the outer circumference of the neck so as to provide a radial clearance between the neck and lid when the lid is placed on the neck, an annular seal having first and second stretches, said first stretch extending along the neck and having at least a portion thereof in contact with the neck, said first stretch having at least a portion thereof greater than the radial clearance between the lid and the neck, said second stretch extending radially and being sized to seat on said shoulder and adapted to have the lid rest thereon.

2. Storage jar as in claim 1, characterized in that said first stretch (3) of said annular seal exhibits an arcuate cross-section whose maximum overall chord-to-vertex width measures marginally greater than the degree of radial clearance existing between said lid and said jar-neck.

3. Jar as in claim 1 characterized in that said annular seal (2) comprises a third stretch (8) between said first and second stretches, designed to locate in an undercut (9) offered by the outer wall of the jar-neck.

4. Storage jar as in claim 1, characterized in that it comprises a protrusion (5) issuing from the base of the jar, and a matching recess (6) located in the jar-lid—the shape and size of said protrusion being such as to permit its fitting exactly into said recess.

* * * * *